(12) United States Patent
Foldes

(10) Patent No.: US 7,182,457 B2
(45) Date of Patent: Feb. 27, 2007

(54) SPECTACLES

(76) Inventor: Sebastian Foldes, Ullerudsbacken 61, Farsta (SE) 123 73

( * ) Notice: Subject to any disclaimer, the term of this patent is extended or adjusted under 35 U.S.C. 154(b) by 0 days.

(21) Appl. No.: 10/509,130

(22) PCT Filed: Mar. 28, 2003

(86) PCT No.: PCT/SE03/00509

§ 371 (c)(1),
(2), (4) Date: Jun. 14, 2005

(87) PCT Pub. No.: WO03/083558

PCT Pub. Date: Oct. 9, 2003

(65) Prior Publication Data

US 2005/0237624 A1    Oct. 27, 2005

(30) Foreign Application Priority Data

Mar. 28, 2002   (SE) ................................ 0200999

(51) Int. Cl.
*G02C 1/00* (2006.01)
(52) U.S. Cl. ........................ 351/41; 351/83; 351/140
(58) Field of Classification Search ............... 351/41, 351/62, 83–86, 154, 140, 141, 44
See application file for complete search history.

(56) References Cited

U.S. PATENT DOCUMENTS

| 5,488,441 | A  |   | 1/1996  | Pomatti |
| 5,949,514 | A  | * | 9/1999  | Wargon ........................ 351/41 |
| 6,761,447 | B1 | * | 7/2004  | Pyo ............................... 351/41 |
| 2005/0237624 | A1 | * | 10/2005 | Foldes ........................ 359/638 |

FOREIGN PATENT DOCUMENTS

| EP | 0526709 A1    | 2/1993 |
| WO | WO 01004692 A1 | 8/2002 |

* cited by examiner

*Primary Examiner*—Huy Mai
(74) *Attorney, Agent, or Firm*—Dowell & Dowell, P.C.

(57) ABSTRACT

An improvement in or relating to spectacles comprising a frame made of a formable material that may be shaped at elevated temperatures, and lenses that are attached to the frame so as to cover a major part of a user's visual field, wherein the formable material is fixed in form and soft and bendable when in an unformed, original state, and is formable at elevated temperatures to form the frame in a configuration that is shaped to the user' face. When the material returns to a temperature of the original state, the frame retains the configuration and is somewhat bendable. The frame includes attachments for positioning the lenses in a predetermined position on the frame to obtain a predetermined distance relative to the eyes and eye lashes of the user.

6 Claims, 3 Drawing Sheets

SPECTACLES

BACKGROUND OF THE INVENTION

FIELD OF THE INVENTION

The present invention refers to an improvement in spectacles comprising a frame of a moldable material, which is formable at elevated temperatures and glasses or lenses attached to the frame. These spectacles are useful in building trades and sports and leisure activities, as well as for children.

BRIEF DESCRIPTION OF THE RELATED ART

The spectacles of today of similar type have a frame that consists of rigid plastic frame as well as metal frames. Both types have in common the characteristics to be firm in their form and that they already are tied to a certain form and by that bound to the form in its entirety. However, small adjustments can be made on the metal frames like they for example can be bent slightly at the sidepieces round the ears. In some situations, as for example sports situations, these frames are ungainly and actually dangerous at harder physical contact. The frames are in this case pressing against the person's root of the nose and the side of the head, like the temple, that gives pressure pain and pressure sore and in the worst case cuts. Metal has also the characteristic easier to create allergy to some people. In addition to this it is common that people in general after a longer period of use experience pressure pain among other things round the nose. The thing that makes the frames ungainly is that they stick out from the shape of the face and unnecessary take up a lot of space. They also give the user a misleading judgement of distance, particularly in extreme cases, for example close contact, this makes that the user easy thrust the spectacles frame against other persons or objects. This could have been prevented in many cases if the frame follows the natural shape of face.

SUMMARY OF THE INVENTION

The object of the present invention is now to provide a new type of spectacles, which solves these problems by that the spectacles are soft, and elastic mouldable. This makes that spectacle frame of the spectacles according to the invention becomes slim lined after the actual person's unique shape of face and foremost with thought of the frames shape on the particular root of the nose. This makes a more comfortable fit, which prevents injuries partly thanks to the material and, partly thanks to the design itself or the shaping. The characterizing features of the invention are stated in the following claims.

Thanks to the invention a new type of spectacles is now provided, which on a splendid way serve its purposes at the same time as they are cheap and easy to produce. The invention consequently refers to a spectacle frame for spectacles first and foremost to users in the sphere of building trade, sports and leisure for children, whose spectacle frame consists of a soft, formable material. By means that the frame can be heated or be cooled and by that become mouldable during a certain temperature, the same can be shaped after the users face and when the frame has reverted to normal temperature the form is fixated and adapted to the users face. Despite that the form is fixated the frame is still soft and elastic. The spectacle frame can consist of a rubber or equal soft, formable material and by that the frame is formable at a certain raised temperature it is possible for the user to adapt the frame after his personally shape of the face. After heating up or cooling the frame keeps its form but is still soft and elastic, which gives the frame a pliable form after the head and root of the nose.

After the frame has been formed the optics is fixed on the frame and to get the frame fixed to the face it can be strapped with elastic bands around the head. This is particularly suitable when the user will perform physical work and exercise sports. Alternatively, beyond elastic frames, the frame can have side pieces that extend on the side of the head and attach one self to the ears or the neck. The side pieces can be of the same material as the frame or of another harder or softer material. Another type of frame can emanate from that the side pieces run up towards the forehead and over the top of the head to finally end up back on the head.

The frame can be mounted with side shields in any other material, which covers to protect against dust or other particles. To avoid mist or perspiration, on account of that the frame is placed close to the user's face and gives off heat, the frame can also be made in models, where the frame or side shield or other material, like thin plastic layer, has cavities to give passage of air. This makes it possible for the frame to respire, which is important for the eyes. To strengthen the frame against undesired forms and wear and tear it can be combined with a harder material like a metal, e.g. titan, or a harder plastic material, which can be placed inside or outside the frame.

BRIEF DESCRIPTION OF THE DRAWINGS

The invention is described closer below with help of some preferable embodiment examples under reference to the attached drawings, on which

DESCRIPTION OF THE PREFERRED EMBODIMENT

Figure 1:
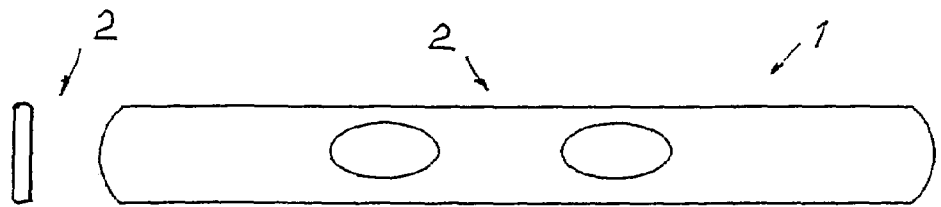
FIG. 1 shows a schematic view from the side and from the front of the glass itself to the spectacles according to the invention in an unformed state.

As can be seen from the drawings, and particularly FIG. 1, a frame 2 to a pair of spectacles 1 is presented with a form and appearance in an unformed state. This is the standard form for the frame 2, which consists of a soft, slightly elastic material for example of rubber or a softer plastic, which wholly or partially after a change of temperature can allow an adaptation of the frame material. In the originally state the material is fixed, that is determined/combined to its form but at the same time soft, movable and flexible.

Figure 2:
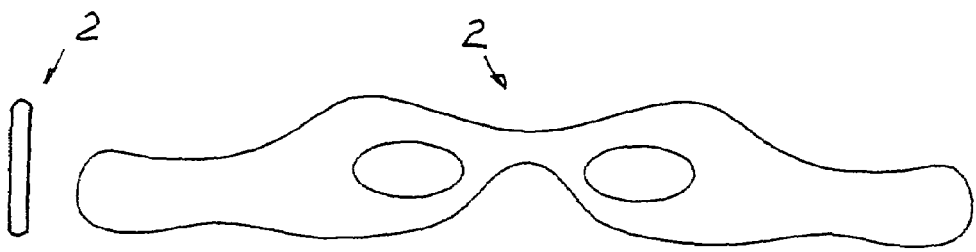
FIG. 2 shows the spectacle frame in FIG. 1 in a side view and a view from the front after a change of temperature.
Figure 3:
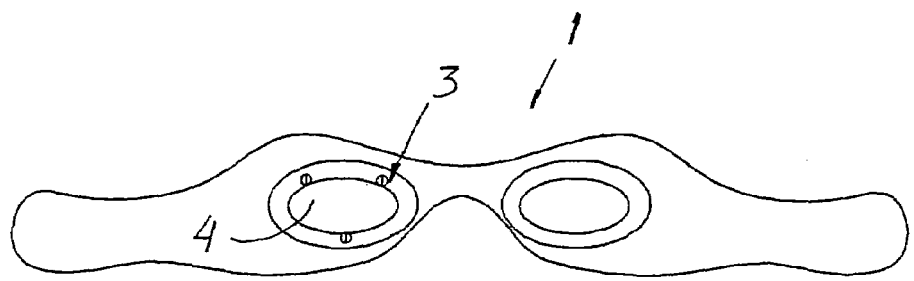
FIG. 3 shows the spectacle frame when it has been formed and regained its fixated state and with the optics fixed.
Figure 4:
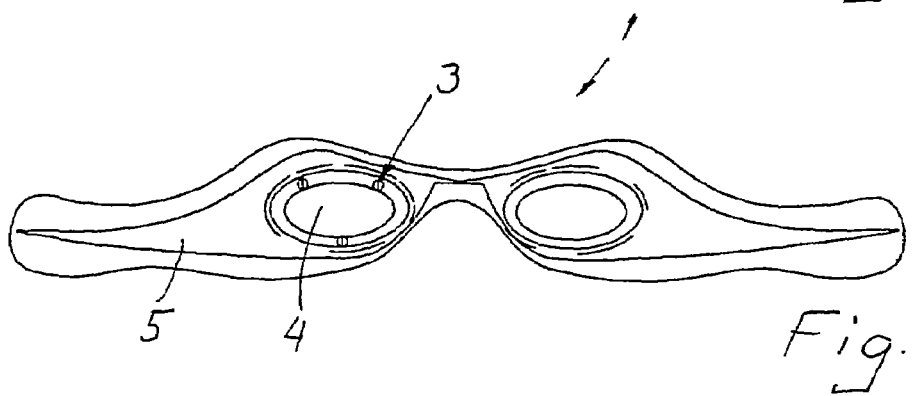
FIG. 4 shows a schematic view from the front of the spectacle frame according to the invention where the frame have glasses mounted and where a thin plastic layer has been applied over glass and frame.

After a certain temperature changing the spectacle frame 2 abandons its fixed form and the material becomes shapeless and formable. At this moment the originally form is changing by that one is pulling out the material and is bending it to the shape of the actual face. When the frame 2 has taken the form desired, one keeps it in the desired form until it has returned to its proper, normal temperature level, when the material is fixed. This is closer illustrated in FIG. 2. At this present state, the spectacle frame has captured its formed or fixed state. The frame 2 is now specifically tried-out and formed after the users shape of face. This gives an optimal, pliable frame against the root of the nose and the eyeball, which extends out towards the temples on the user. The user can at this state bend the frame 2 without that it loses its unique form. If one by a future event would like to adjust the form, this could be possible if you once more are change the form during the specific change of temperature.

Figure 5:
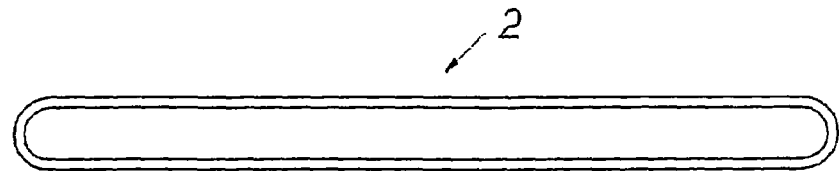
FIG. 5 shows a schematic view from the front of an alternative embodiment example of the spectacle frame itself, when it consists of a thread-shaped material in an unformed state.
Figure 6:
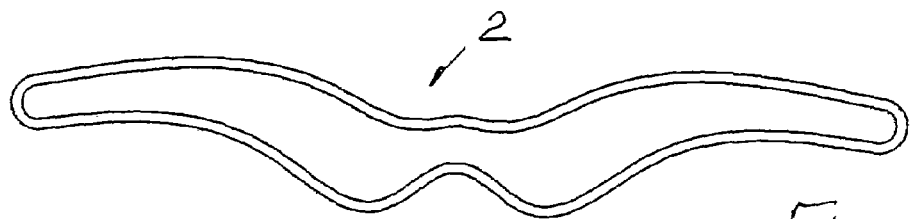
FIG. 6 shows the spectacle frame according to FIG. 5 after a change of temperature.
Figure 7:
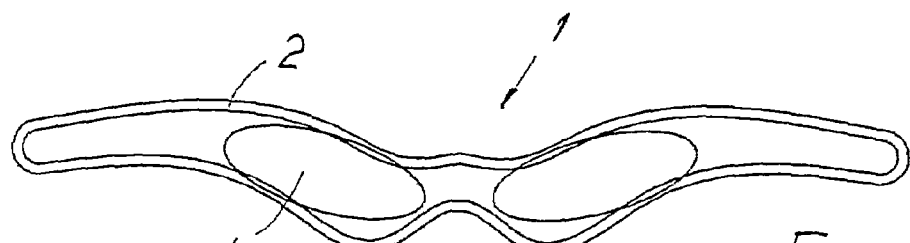
FIG. 7 shows the spectacle frame according to FIG. 6 with applied glasses.
Figure 8:
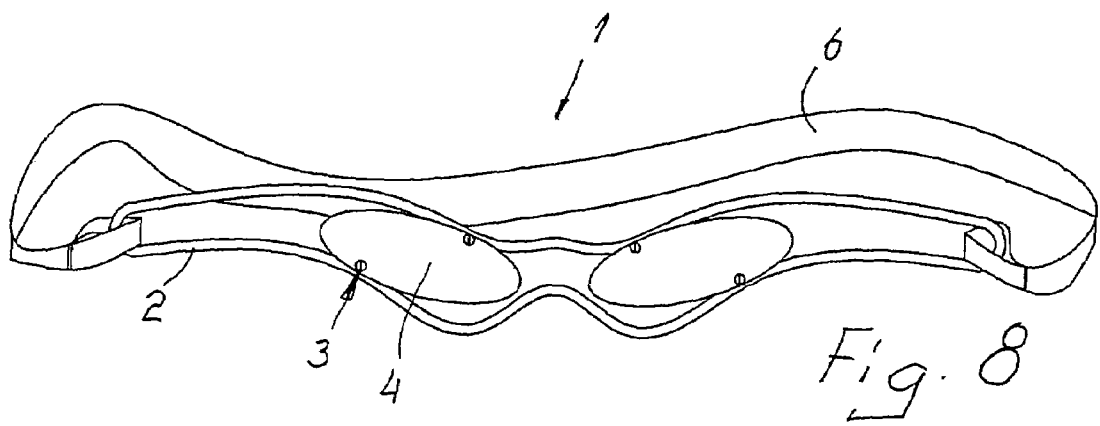
FIG. 8 shows the spectacles according to FIG. 7 with applied string to be fixed on an users head.
Figure 9:
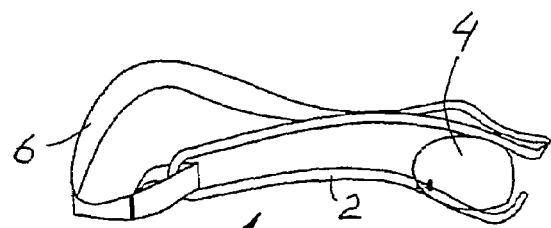
FIG. 9 shows a schematic view from the side of the embodiment example according to FIGS. 5–8 and more exact the spectacles provided with strings according to FIG. 8.
Figure 10:
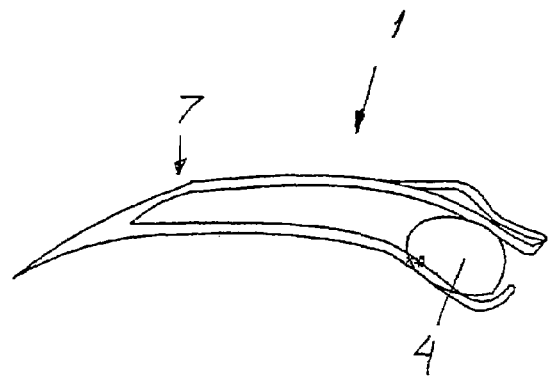
FIG. 10 shows the same spectacles as according to FIG. 7 but with side pieces instead of strings.
Figure 11:
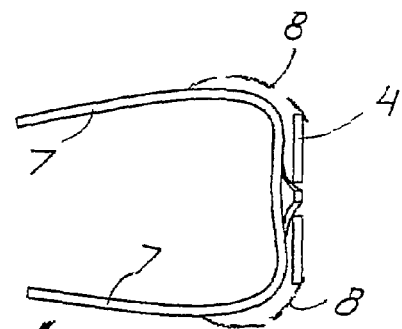
FIG. 11 shows a schematic view from above of the spectacles with side pieces according to FIG. 10, provided with side protection
Figure 12:
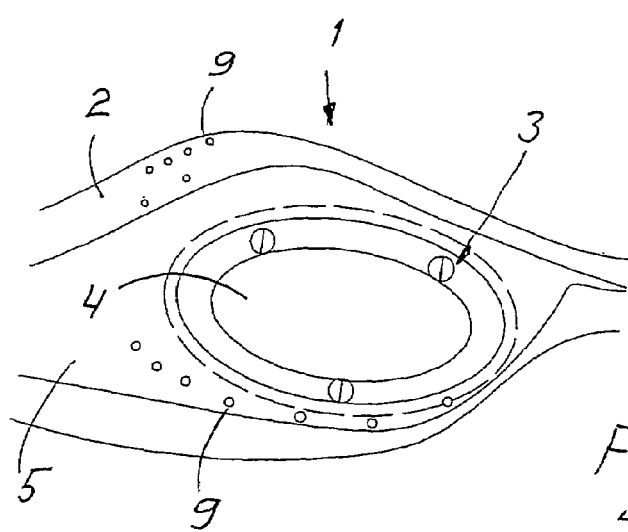
FIG. 12 shows a schematic partial view of the spectacles according to FIG. 4, where the frame and the thin plastic layer comprise vents.

In FIGS. 5 and 6 an alternative embodiment example of the frame is illustrated, when it consists of a thread shaped material corresponding to that, which is used in the first example.

In FIGS. 3–4 and 7–12 the spectacle frame 2 is presented, when it has been provided with optical glasses. The spectacle frame shows according to the preferred examples fixing means of the type both of string 6 and side pieces 7. The optical glasses 4, which at the present state are arched, are fixed in position on a predetermined distance from the frame 2 by aid of attachments 3. Since the glasses 4 are arched after the eyes' natural shape, this results in that they cover a greater part of the visual field and thereby that they also enlarge the acuity of the user. As an ergonomic aspect this also gives a pleasantly space to the eye lashes of the user. The attachments 3 allow an adjusting of the distance of the glasses 4 from the frame 2 and sideways depending on the actual user. Consequently the attachments 3 can be adjusted in length partly to the form of the frame and partly where they are placed on the frame 2, so that the glasses 4 can get the right distance relative eye and eye lashes. The material for the attachments 3 can consist of a softer, flexible material, which reduces the risk of damage but is at the same time increasing the glasses' adaptation to the frame. The number of attachments 3 for the glasses 4 can vary according to the size.

A plastic layer 5 can be fixed over the glasses 4 and the frame 2, said layer 5 is intended to cover any edges or trims that may occur to give partly a better impression, partly protect and at the same time give more stability to the glasses 4 against the frame 2.

On the frame 2 side shields can also be mounted. To avoid mist on the glasses 4 both the frame and the plastic layer can, as illustrated in detail in FIG. 12, have air openings 9.

The attachments 3 can consist of screws or magnets which are fixing the glasses 4 in position against the frame 2 or rubber mouldings, in which the glass is pushed in through an incision or is pressed into.

The invention claimed is:

1. An improvement relating to spectacles comprising: a frame made of a formable material that may be shaped at elevated temperatures, and lenses that are attached to said frame so as to cover a major part of a user's visual field, wherein said formable material, is fixed in form and soft and bendable when in an unformed, original state, and is formable at elevated temperatures to form said frame in a configuration that is cooperatively shaped to the user's face, said frame retaining the configuration and being bendable after said material returns to a temperature of the original state, and wherein said frame includes attachments for positioning said lenses relative to said frame.

2. The improvement according to claim 1, wherein said attachments adjust the position of said lenses relative to said frame to obtain a predetermined distance relative to the eyes and eye lashes of the user, and wherein said attachments are selected from a group consisting of screws, magnets and rubber strips.

3. The improvement according to claim 1, further comprising at least one shield that extends at least partly over said lenses and said frame to cover edges so that the at least one shield serves as protection for the spectacles and provides stability to said lenses against said frame.

4. The improvement according to claim 1, wherein said frame includes a fixing means selected from a group consisting of elastic strings, sidepieces, and a fastening device, the fixing means fits around the ear of the user.

5. The improvement according to claim 1, wherein said frame further includes a harder material in order to reinforce said frame, wherein the harder material is fastened on said frame after the formable material is formed against the face of the user.

6. The improvement according to claim 1, wherein only a part of said frame is made from the formable material.

* * * * *